United States Patent [19]

Hinson

[11] 4,317,345
[45] Mar. 2, 1982

[54] FUEL TANK LOCKING DEVICE

[75] Inventor: Lee R. Hinson, Stockton, Calif.

[73] Assignee: Fuel Lock Systems, Stockton, Calif.

[21] Appl. No.: 161,858

[22] Filed: Jun. 23, 1980

Related U.S. Application Data

[63] Continuation-in-part of Ser. No. 120,023, Feb. 11, 1980, abandoned.

[51] Int. Cl.³ .............................................. B65D 55/14
[52] U.S. Cl. ....................................... 70/170; 70/163; 220/86 AT; 220/210
[58] Field of Search .......................... 70/158, 163–173; 220/210, 284, 327, 86 AT

[56] References Cited

U.S. PATENT DOCUMENTS

| | | | |
|---|---|---|---|
| 1,065,358 | 6/1913 | Hanson | 70/168 |
| 1,476,074 | 12/1923 | Hanson | 70/172 |
| 1,624,840 | 4/1927 | Malluk | 70/172 X |
| 1,687,601 | 10/1928 | Whitley | 220/327 X |
| 2,131,243 | 9/1938 | Whitaker | 70/165 |
| 3,998,353 | 12/1976 | Farelli | 70/167 X |

FOREIGN PATENT DOCUMENTS 1169343  11/1969  United Kingdom ................. 70/168

Primary Examiner—William E. Lyddane
Attorney, Agent, or Firm—Thomas R. Berthold

[57] ABSTRACT

A locking device for fuel tanks which blocks the filler neck in the tank. A cylindrical sleeve having an opening through its length inserts into the filler neck below the outer end of the filler neck and is secured by set screws threaded through the sleeve wall into contact with the filler neck. Blocking means comprising a cylinder lock and an annular adapter, when the device is used on large diameter filler necks, fit into the sleeve, blocking the opening in the sleeve and covering access to the set screws. The cylinder lock, which is key-activated, includes an arm which rotates into engagement with the sleeve, preventing removal of the blocking means.

1 Claim, 6 Drawing Figures

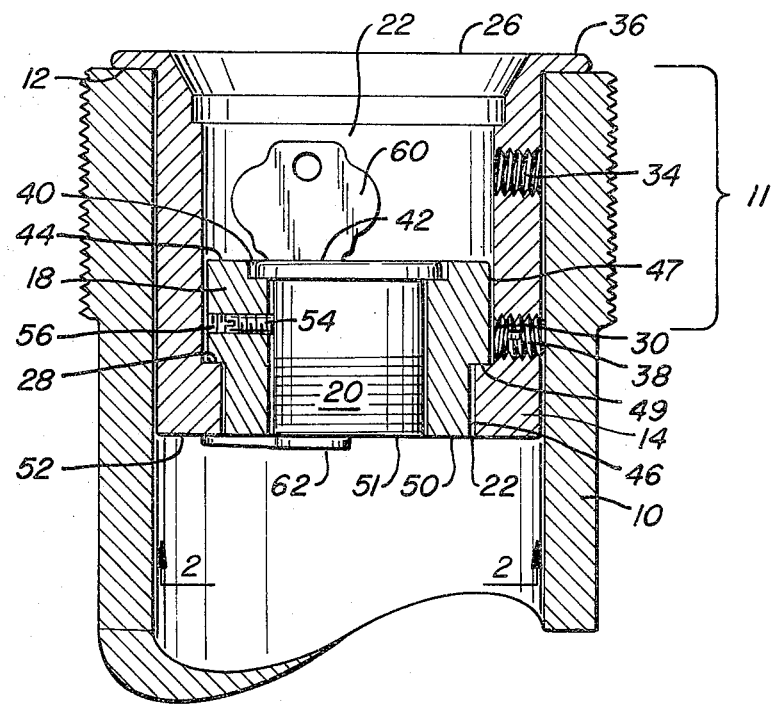
FIG._1.
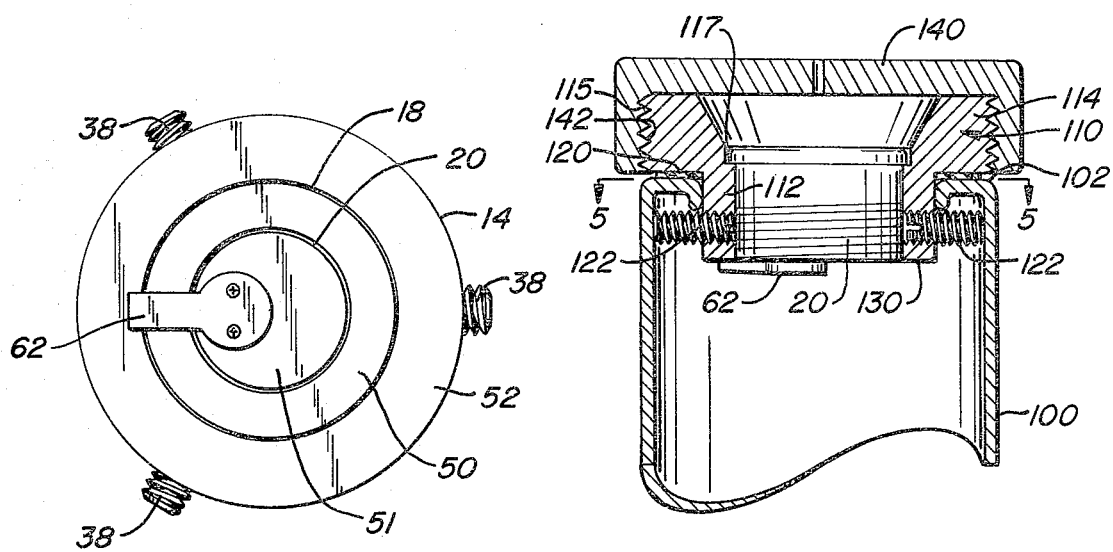
FIG._2.
FIG._4.

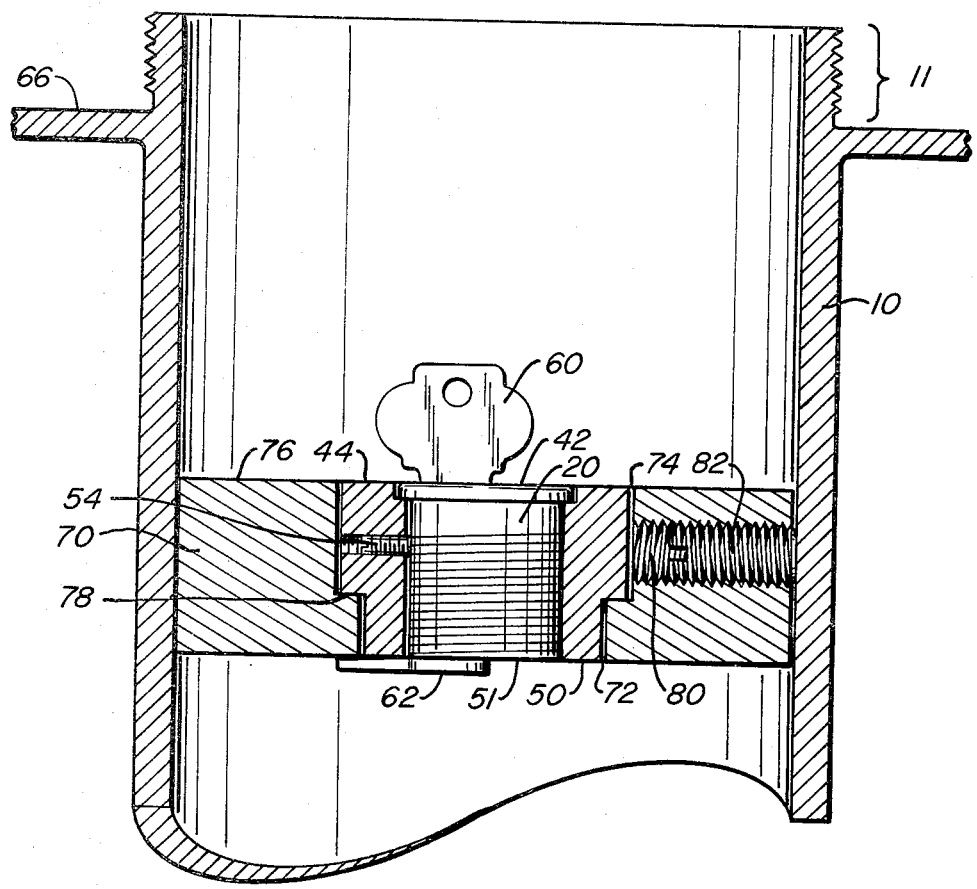
FIG._3.
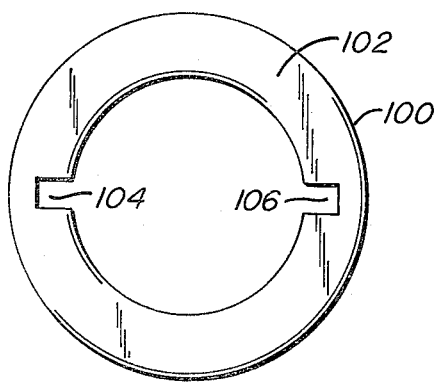
FIG._5.
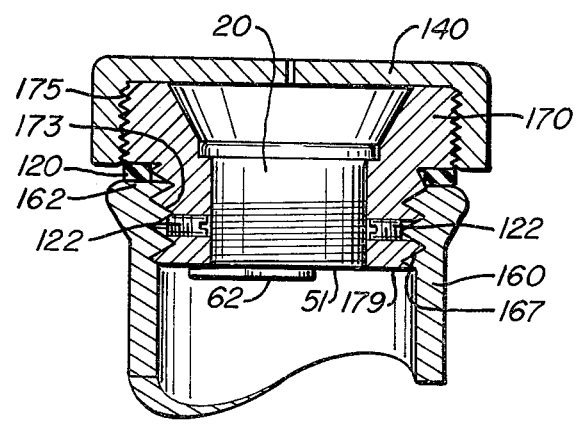
FIG._6.

FUEL TANK LOCKING DEVICE

BACKGROUND OF THE INVENTION

This invention is a continuation in-part of application Ser. No. 06/120,023 filed Feb. 11, 1980 abandoned.

This invention relates to fuel tank locating devices, and more particularly to locking devices for fuel tanks having filler necks which serve as the means for introducing fuel into the tanks.

With the rapidly increasing cost of gasoline and diesel fuel, the theft of fuel from trucks and automobiles is becoming more prevalent. In the particular case of large diesel trucks, whose fuel tanks may have a two to three hundred gallon capacity, the theft of fuel can be quite lucrative.

The conventional device for locking fuel tanks on trucks and automobiles is a lockable cap which screws over the outside of the filler neck extending out of the tank. This type of cap is key-activated and since it is readily accessible to a potential thief, it may be easily picked. Additionally, since the cap usually extends over the end of the filler neck, it can be easily pried off or otherwise forcibly removed.

SUMMARY OF THE INVENTION

The invention comprises broadly a sleeve having an opening through its length and insertable into the fuel tank filler neck, means for securing the sleeve to the filler neck, and means engageable with the sleeve for blocking the sleeve opening to thereby lock the fuel tank.

The sleeve which is insertable into the filler neck has a generally cylindrical configuration with an outer diameter slightly less than the inner diameter of the filler neck so that a relatively close tolerance between the sleeve and the filler neck is created. The sleeve also has a first bore through its central axis which defines an opening for the introduction of fuel into the tank when the opening is not blocked. A second bore extending from the front face of the sleeve is counter-sunk to a predetermined depth so that termination of the counter-sunk bore in the sleeve defines a generally annular face. Extending radially outwardly from the inner cylindrical surface formed by the counter-sunk bore is a plurality of threaded bores. In one embodiment of the invention, the sleeve included a radially outwardly extending rim on its outer end. The rim overlaps the outer end of the filler neck when the sleeve is inserted into the filler neck.

In the preferred embodiment, the means for securing the sleeve to the filler neck comprises a plurality of set screws threadable through the radial bores in the sleeve into contact with the filler neck. The set screws are of predetermined length so that after they are tightened into contact with the filler neck, they are recessed in the cylindrical wall of the sleeve.

The means for blocking the opening in the sleeve secured to the filler neck comprises a conventional key-activated cylinder lock having an eccentrically rotatable arm on its back face and a key opening on its front face; an annular-shaped adapater having an axial length equal to that of the cylinder lock, an inner diameter slightly larger than that of the cylinder lock to permit the cylinder lock to be inserted therein, and an outer surface configured for fitting into the counter-sunk bore of the sleeve; and means for retaining the cylinder lock to the annular adapter.

In operation, the sleeve is placed into the filler neck and the set screws tightened into contact with the filler neck, thereby securing the sleeve within the filler neck. The adapter and retained cylinder lock are inserted into the sleeve, specifically into the counter-sunk bore, until the adapter contacts the annular face within the sleeve. At this point the back faces of the sleeve, annular adapter and cylinder lock are generally flush with one another so that in the arm on the cylinder lock backface, when turned by the key, is free to rotate beyond the annular adapter and overlap the back face of the sleeve. Thus the adapter and cylinder lock are locked into the opening of the sleeve. The radial bores in the sleeve are axially positioned so that when the adapter and cylinder lock are blocking the sleeve opening, the radial bores are concealed and access to the set screws is prevented. The key is removed and the conventional cap is screwed over the filler neck.

It should be apparent that the above-described invention provides a secure locking device for truck and automobile fuel tanks. Since the means which blocks the filler neck, specifically the annular adapter and cylinder lock, is slightly recessed from the outer end of the filler neck, forcible entry into the locking device is substantially prevented. Additionally the annular shaped and cylinder lock are designed so that their front faces are generally flush with one another, thereby substantially preventing forcible removal of the cylinder lock from the annular adapter.

The embodiments described above are directed primarily to truck fuel tanks which have relatively large-diameter filler necks. When the invention is used on smaller-diameter filler necks, such as those common in automobiles, the annular adapter is not required. In such an embodimemt the sleeve comprises a lower portion which is engageable with the interior of the filler neck, either by threading into internal threads or by locking into a slot arrangement on the filler neck, and an upper portion which extends radially outwardly and overlaps the end of the filler neck. The outer cylindrical surface of the upper portion is threaded for receipt of a conventional gas cap. Set screws secure the sleeve to the inside of the automobile filler neck and a gasket located between the end of the filler neck and the upper portion of the sleeve seals to the filler neck. The cylinder lock is inserted directly into the opening in the sleeve without an annular adapter and locks to the sleeve in the previously described manner.

BRIEF DESCRIPTION OF THE DRAWINGS

FIG. 1 is a sectional view illustrating one embodiment of the invention installed in the filler neck of a fuel tank;

FIG. 2 is an end view illustrating the cylinder lock and the means for securing the invention to the filler neck of a fuel tank;

FIG. 3 is a sectional view illustrating an embodiment of the invention for use on special types of fuel tanks;

FIG. 4 is a sectional view illustrating an embodiment of the invention for use on automobile fuel tanks;

FIG. 5 is a view of Section 5—5 of FIG. 4; and

FIG. 6 is a sectional view illustrating an embodiment of the invention for use on automobile fuel tanks having an internally threaded filler neck.

DESCRIPTION OF THE PREFERRED EMBODIMENTS

Referring first to FIG. 1, shown in sectional view is a typical filler neck 10 having an upper threaded portion 11 for receiving a filler cap (not shown).

The invention comprises generally a sleeve 14 having a central opening and insertable into filler neck 10, means for securing sleeve 14 to filler neck 10, such as set screws 38, and means for blocking the opening in sleeve 14, which further comprises an annular adapter 18 and a retained conventional cylinder lock 20.

Sleeve 14 is of a cylindrical configuration and has a central bore 22 extending through its length and a counterbore 24 counter-sunk to a predetermined depth from the front face 26. Counter-bore 24 is concentric with bore 22 but is of greater diameter so that the termination of bore 24 within sleeve 14 defines a generally annular face 28. Sleeve 14 also includes a plurality of radially directed threaded bores 30 which extend through its cylindrical wall. Since FIG. 1 is a sectional view of the invention, only one of set screws 16 and radial bores 30 is illustrated. In the preferred embodiment three bores are equally spaced about the circumference of sleeve 14 at the same axial position. As shown in FIG. 1 a second set of bores 34 is axially spaced from the first plurality of bores 30 so that sleeve 14 may be secured to various types of filler necks in the manner more fully described below.

The three radially directed threaded bores 30 receive the means for securing sleeve 14 to filler neck 10. A like plurality of threaded set screws 38 are threaded into bores 30 and into contact with filler neck 10 for securing sleeve 14 thereto. FIG. 2 illustrates the invention with the filler neck 10 and shows set screws 38 equally angularly spaced about the circumference of sleeve 14 and extending through the wall of sleeve 14 for contact with filler neck 10.

In the embodiment shown in FIG. 1, sleeve 14 also includes a radially extending rim 36 at its outer end for overlapping the end 12 of filler neck 10. In such an embodiment, when rim 36 contacts end 12 of filler neck 10, sleeve 14 is prevented from passing further down filler neck 10.

Referring again to FIGS. 1 and 2, the means for blocking the opening in sleeve 14 defined by bores 22, 24 comprises generally an annular adapter 18, a conventional cylinder lock 20 retained inside annular adapter 18, and means for retaining cylinder lock 20 within adapter 18. Adaptor 18 has an inner diameter slightly larger than the outer diameter of cylinder lock 20 and a recess 40 which permits cylinder lock 20 to be placed inside adapter 18 so that the front faces 42 and 44 of cylinder lock 20 and annular adapter 18, respectively, are generally flush with one another, thereby substantially preventing forcible removal of cylinder lock 20 from adapter 18. The outer surfaces 46, 47 of adapter 18 are configured for fitting within sleeve 14 and for contact with annular face 28. More particularly, outer surfaces 46, 47 of adapter 18 are of different diameters so that an annular lip 49 is defined which contacts annular face 28 on sleeve 14. The axial length of cylindrical surface 46 of adapter 18 is preselected so that the back face 50 of adapter 18 is generally flush with the back face 52 of sleeve 14 when lip 49 contacts face 28.

Cylinder lock 20 is connected to adapter 18 by means of a set screw 54 threadable through a radial bore 56 in adapter 18 and into contact with the surface of cylinder lock 20. Rotation of cylinder lock 20 within annular adapter 18 is thus prevented.

Cylinder lock 20 is a conventional key-activated cylinder lock and has a key opening (not shown) for insertion of key 60 and an eccentrically rotatable arm 62 (FIG. 2) which is rotated by rotation of key 60. Arm 62 is of sufficient length so that when it is rotated it extends beyond the outermost extent of back face 50 of annular adapter 18 and overlaps the back face 52 of sleeve 14.

The invention as thus described and illustrated in FIGS. 1 and 2 is designed for use on fuel tanks having filler necks which extend outwardly a considerable distance from the tanks. In the event the length of filler neck 10 is substantially shorter than that shown in FIG. 1, sleeve 14 may be secured to filler neck 10 by placing set screws 38 through radial bores 34. In such a configuration a portion of sleeve 14 extends into the interior of the fuel tanks. When the invention is used on fuel tanks having such short filler necks, the radial bores 34 may be filled with a liquid metal to seal access to the set screws 38, after the set screws have been threaded into contact with filler neck 10. However, when the invention is used on filler necks of the length shown in FIG. 1, it should be apparent that adapter 18 blocks access to set screws 38 which are threaded into radial bores 30.

Referring now to FIG. 3, the invention is shown in an embodiment for use on fuel tanks having virtually no filler neck extending above the tank. In such a type of fuel tank, filler neck 10 extends below tank wall 66 into the interior of the fuel tank. The embodiment for use in such a fuel tank comprises the same annular adapter 18 and cylinder lock 20, but a modified sleeve, specifically disk 70. Disk 70 is of a generally circular configuration and has a first bore 72 extending through the central axis and a second bore 74 counter-sunk to a predetermined depth from the front face 76. The second bore 74 is counter-sunk to a predetermined depth so that the termination of bores 72 and 74 define a generally annular face 78 within disk 70. Disk 70 also includes a plurality of radially directed threaded bores 80, one of whch is shown in FIG. 3.

Disk 70 is secured to the inside of filler neck 10 by a like plurality of set screws 82 which are threaded through bores 80 and into contact with filler neck 10. The adapter 18 and retained cylinder neck 20 function in the manner as previously described.

The invention can be better understood by considering the function of the above-described component parts to lock a fuel tank. Referring to FIG. 1, the locking device is installed by first removing the fuel tank cap (not shown) by unthreading it from threaded portion 11 of filler neck 10. Sleeve 14 is then inserted into filler neck 10 until rim 36 contacts the outer end 12 of filler neck 10. The set screws 38 are threaded through bores 30 and tightened by means of a conventional Allen wrench until they are in forcible contact with filler neck 10. Sleeve 14 is thus secured to filler neck 10. Cylinder lock 20 is inserted into the inside of annular adapter 18 and set screw 54 is tightened to prevent rotation of cylinder lock 20 within adapter 18. Key 60 is turned so that rotatable arm 62 on the back face 51 of cylinder lock 20 points generally inward toward the center of cylinder lock 20. Annular adapter 18 with its retained cylinder lock 20 is then inserted into bore 24 of sleeve 14 until it contacts annular face 28. Key 60 is turned to rotate arm 62 so that it extends beyond the outermost extent of back face 50 of annular adapter 18 and overlaps back face 52 of sleeve 14. While adapter 18 and cylinder lock 20 are free to rotate within sleeve 14, such free rotation does not prevent key 60 from being turned since key 60 is located off-center and since adapter 18 is massive enough that it does not turn when key 60 is turned. It may be desirable, however, to provide a spline on adapter 18 and a corresponding slot on the inner surface of sleeve 14 to prevent such rotation. Key 60 is then removed and the opening into sleeve 14 and thus into the fuel tank is blocked. The cap is then screwed back on to filler neck 10.

The functional operation of the embodiment in FIG. 3 is identical to that of the embodiment in FIG. 1, with the exception that disk 76 is lowered the desired distance within filler neck 10 before set screws 82 are threaded into contact with filler neck 10.

It should be apparent that in both embodiments the blocking means is located some distance from the outer end 12 of filler neck 10 so that forcible entry into the fuel tank by attempting to remove the locking device is substantially prevented. Also with respect to the embodiment in FIG. 3, and as previously discussed with respect to the embodiment in FIG. 1, the front faces 42, 44, and 76 of cylinder lock 20, annular adapter 18 and disk 76, respectively, are generally flush with one another, thereby substantially preventing any forcible removal of these parts apart from one another.

When it is desired to unlock the locking device so that fuel may be introduced into the tank, key 60 is turned and arm 62 is rotated away from overlapping engagement with back face 52 of sleeve 14, or with back face 63 of disk 76. The annular adapter 18 and retained cylinder lock 20 are removed, thus permitting fuel to flow through the opening in sleeve 14 or disk 76.

The embodiment of the invention illustrated in FIGS. 4 and 5 is for use on fuel tanks having a substantially smaller-diameter filler neck than that shown in the embodiments of FIGS. 1-3, e.g. automobile fuel tanks. One conventional type of automobile tank filler neck 100 is shown in top view in FIG. 5. Generally, filler neck 100 is conventionally formed of stainless steel. Its upper end 102 is bent over, as better illustrated in FIG. 4, and has two slots 104, 106 on opposite sides. While not shown in FIGS. 4 and 5, the edge of the bent-over end 102 of the stainless steel wall forms a generally slight downward curve from slot 104 towards slot 106. In such a construction of filler neck 100, a conventional cap (not shown) has opposing lips aligned for insertion into slots 104, 106. When this conventional cap is inserted into the slots and rotated approximately one-quarter turn, the lips ride down the bottom edge (not shown) of the stainless steel wall and forcibly fit the cap to the filler neck 100. The fuel tank lock illustrated in FIG. 4 is designated for use with such a conventional type of filler neck 100.

Sleeve 110 has a lower portion 112 of generally cylindrical configuration and a upper portion 114 which extends radially outwardly beyond the cylindrical outer surface of lower portion 112 and overlays end 102 of filler neck 100. The outer cylindrical surface of upper portion 114 is threaded, as shown in FIG. 4. Like the embodiments illustrated in FIGS. 1-3, the lower portion 112 of sleeve 110 has set screws 122 threaded through its wall. However, only two set screws are provided and are on opposite sides of sleeve 110. A recess 117, like recess 40 on annular adapter 18 (FIG. 1), provides for receipt of cylinder lock 20. The key-activated cylinder lock 20, with its rotatable arm 62, is identical to that shown in the embodiments of FIGS. 1-3 and fits within the opening of sleeve 110. A gasket 120 is provided for sealing sleeve 114 to the end 102 of filler neck 100 to prevent the escape of gas fumes.

In order to secure sleeve 110 to the conventional filler neck 100, the set screws 122, which extend slightly beyond the outer cylindrical surface of lower portion 112, are aligned with slots 104 and 106. Sleeve 110 is then inserted downward until gasket 120 is seated on the end 102 of filler neck 100. Sleeve 110 is then rotated, just like the conventional gas cap with lips (not shown) is rotated, to tighten sleeve 110 to filler neck 100. The rotation of sleeve 110, by approximately one-quarter turn, not only partially secures sleeve 110 to filler neck 100, but also compresses gasket 120 and thereby seals upper portion 114 to the end 102 of filler neck 100. Next the set screws 122 are tightened with a conventional Allen wrench to secure sleeve 110 within filler neck 100. After the set screws 122 have been tightened they become recessed within the inner surface of lower portion 112 of sleeve 110 so that when cylinder lock 20 is inserted into the opening in sleeve 110 access to set screws 122 is prevented.

The eccentrically rotatable arm 62 on key-activated cylinder lock 20 rotates to overlap the back face 130 of sleeve 110 to block access to the interior of the automobile fuel tank. A gas cap 140 having threads 142 for engagement with the threads on the outer cylindrical surface of upper portion 114 covers the filler neck 100, and replaces the conventional gas cap.

Referring now to FIG. 6, another embodiment of the invention is shown for use in automobiles which have still another conventional type of filler neck 160. Filler neck 160 is cylindrically shaped and has internal threads 167 formed on its interior surface for receipt of a similarly threaded gas cap. The conventional gas cap (not shown) used on filler necks of the type like 160 simply rotates into engagement with the threads 167 on the interior surface of filler neck 160 until the top portion of the cap is sealed, by means of a gasket 120, to the upper end 162 of the filler neck. The sleeve 170 shown in FIG. 6 of the present invention is identical to that of sleeve 110 (FIG. 4), with the exception that the outer cylindrical surface of its lower portion has threads 173 for engagement with the internal threads 167 of filler neck 160.

To secure sleeve 170 to filler neck 160, sleeve 170 is turned until it is threaded into filler neck 160 and gasket 120 is compressed, thereby creating a seal between sleeve 170 and the end 162 of the filler neck. Two set screws 122 are also provided in the lower portion of sleeve 170 for preventing the removal of sleeve 170 once it has been threaded in. Cylinder lock 20 is secured to sleeve 170 to block access to the fuel tank, in the same manner as previously described. A replacement gas cap 140 functions in the same manner as described for the embodiment of FIG. 4 by threading over the upper portion of the sleeve.

It should be apparent that while the sleeve 110 (FIG. 4) would function with filler neck 160, the provision of threads 173 on the outer surface of the lower portion of sleeve 170 both additionally secures sleeve 170 to filler neck 160 and assists in the sealing of gasket 120.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. A locking device for a fuel tank of the type having a filler neck with its end having two slots opposite one another for receipt of a fuel tank cap with lips adapted for engagement with the slots on the filler neck end, the locking device comprising:

a sleeve having a central bore through its longitudinal axis, said sleeve further comprising a lower generally cylindrical portion having two threaded radially directed bores extending therethrough from opposite sides of said sleeve and an upper generally cylindrical portion integrally connected with said lower portion and defining a rim extending radially outwardly beyond the radial extent of said lower portion for overlapping engagement with the end of the filler neck, the outer cylindrical surface of said upper portion being threaded;

two set screws threadable into said radial bores beyond the inner cylindrical surface of said sleeve for securing said sleeve to the filler neck after said sleeve has been inserted into the filler neck, each of said screws having a length such that they extend outwardly a substantial distance beyond the outer surface of the lower generally cylindrical portion of said sleeve and a diameter less than the width of the slots on the filler neck, whereby when said sleeve is turned after it has been inserted into the filler neck, said screws compress the rim down onto the filler neck end;

a gasket for sealing the rim of the sleeve to the end of the filler neck;

a key-activated cylinder lock for blocking the central bore of said sleeve, said lock having a rotatable arm on its back face, whereby when said cylinder lock is inserted into the central bore in said sleeve, access to said set screws is prevented and said arm may be rotated to extend beyond the outer diameter of said lock and into engagement with said sleeve, thereby locking said cylinder lock within said sleeve; and a replacement fuel tank cap adapted for threaded engagement with the upper portions of said sleeve for covering the filler neck.

* * * * *